United States Patent
Ryan et al.

(10) Patent No.: US 10,709,072 B2
(45) Date of Patent: Jul. 14, 2020

(54) STACKABLE SELF-WATERING PLANTER WITH REMOVABLE RISER

(71) Applicant: Classic Home & Garden, LLC, Monroe, NY (US)

(72) Inventors: Fred Joseph Ryan, Trumbull, CT (US); Hamilton Scott Team, Cumming, GA (US)

(73) Assignee: CLASSIC HOME & GARDEN, LLC, Monroe, CT (US)

( * ) Notice: Subject to any disclaimer, the term of this patent is extended or adjusted under 35 U.S.C. 154(b) by 198 days.

(21) Appl. No.: 15/848,787

(22) Filed: Dec. 20, 2017

(65) Prior Publication Data

US 2019/0183063 A1 Jun. 20, 2019

(51) Int. Cl.
*A01G 9/02* (2018.01)
*A01G 27/02* (2006.01)

(52) U.S. Cl.
CPC .............. *A01G 9/02* (2013.01); *A01G 27/02* (2013.01)

(58) Field of Classification Search
CPC ... A01G 9/23; A01G 9/02; A01G 9/28; A01G 27/02; A01G 9/24; A01G 9/88; A01G 27/005; A01G 9/04; A01G 9/023; A01G 9/028; A01G 9/024; A01G 9/088
USPC ... 47/21.1, 29.6, 65, 65.6, 66.7, 66.6, 41.01, 47/71, 75, 79, 86
See application file for complete search history.

(56) References Cited

U.S. PATENT DOCUMENTS

| | | | |
|---|---|---|---|
| 2,484,909 A * | 10/1949 | Ritter | A01G 9/02 47/79 |
| 5,042,197 A | 8/1991 | Pope | |
| 5,315,783 A * | 5/1994 | Peng | A01G 27/00 47/31.1 |
| D352,480 S * | 11/1994 | Carlson | 47/79 |
| 7,690,151 B2 | 4/2010 | Wilkes | |
| D675,492 S * | 2/2013 | Art | D32/54 |
| 9,521,811 B2 * | 12/2016 | Peterson | A01G 27/005 |

(Continued)

FOREIGN PATENT DOCUMENTS

| | | | | |
|---|---|---|---|---|
| DE | 202018001741 U1 * | 7/2019 | ............. | A01G 9/028 |
| WO | WO-2017208008 A1 * | 12/2017 | ............. | A01G 27/02 |

OTHER PUBLICATIONS

"WaterEase Self-Watering Planter with Support", Gardeners.com, https://www.gareneers.com/buy/waterease-self-watering-planter-with-obelish-support/8590223.html, Sep. 5, 2015.

(Continued)

*Primary Examiner* — Magdalena Topolski
*Assistant Examiner* — Katelyn T Truong
(74) *Attorney, Agent, or Firm* — Tutunjian & Bitetto, P.C.

(57) ABSTRACT

A planter and planter stack are described. The planter includes a planter pot configured to be nestable with other such planter pots. The planter pot includes a base, a planter sidewall integrally formed on the base and extending upwards towards a rim, and a hollow support pillar formed on the base and extending substantially vertically upwards with a drain opening at the top of the hollow support pillar in communication with an exterior side of the base. The planter further includes a removable riser configured to be nestable with other such removable risers. The removable riser includes a plate supported by an interior of the planter sidewall by an interference fit, and an aperture configured to accept a corresponding hollow support pillar.

2 Claims, 9 Drawing Sheets

(56) References Cited

U.S. PATENT DOCUMENTS

| | | | | |
|---|---|---|---|---|
| 2002/0174599 A1* | 11/2002 | Rose | ................... | A01G 9/02 |
| | | | | 47/65.6 |
| 2004/0065010 A1* | 4/2004 | Shannon | ............... | A01G 9/02 |
| | | | | 47/65.6 |
| 2005/0198898 A1* | 9/2005 | Vogt | ................... | A01G 27/06 |
| | | | | 47/65.6 |
| 2010/0229464 A1* | 9/2010 | Wilkes | ................ | A01G 9/023 |
| | | | | 47/82 |
| 2010/0287833 A1* | 11/2010 | Keats | ................ | B65D 21/043 |
| | | | | 47/81 |
| 2015/0040474 A1* | 2/2015 | Lee | ................... | A01G 9/02 |
| | | | | 47/65.6 |
| 2015/0366144 A1* | 12/2015 | Russell | ............ | A01G 27/008 |
| | | | | 47/65.6 |
| 2018/0184601 A1* | 7/2018 | Graffius | ............ | A01G 27/00 |

OTHER PUBLICATIONS

Gardener's Supply Company, "WaterEase Self-Watering Planter", 0704G Rev Jan. 2015.

\* cited by examiner

STACKABLE SELF-WATERING PLANTER WITH REMOVABLE RISER

BACKGROUND

Technical Field

The present invention relates to planters, and more particularly to planters having a stackable pot and stackable removable riser for increased freight efficiency.

Description of the Related Art

Watering plants often requires a precise volume of water to ensure that the plant is healthy. It is necessary to ensure that the plant has enough water, without overwatering the plant. Overwatering can result in the plant looking wilted and discolored, or even resulting in irreparable cell damage to leaves and petals. As a result, it is necessary to maintain a watering amount within a precise range to ensure a healthy plant.

Some planters may include a reservoir below the plant to hold an amount of water that the plant can access. However, including a reservoir in a planter often creates a large, inaccessible area in the planter that takes up space when shipping or storing the planter. As a result, planters with reservoirs are often bulky to ship and to store, resulting in higher costs for shipping and storage, as well as inconvenience for the user when the planter is not in use. As a result, a more space efficient planter is needed to reduce shipping costs and storage requirements.

SUMMARY

According to embodiments of the present invention, a planter is described. The planter includes a planter pot configured to be nestable with other such planter pots. The planter pot includes a base, a planter sidewall integrally formed on the base and extending upwards towards a rim, and a hollow support pillar formed on the base and extending substantially vertically upwards with a drain opening at the top of the hollow support pillar in communication with an exterior side of the base. The planter further includes a removable riser configured to be nestable with other such removable risers. The removable riser includes a plate supported by an interior of the planter sidewall by an interference fit, and an aperture configured to accept a corresponding hollow support pillar.

According to other embodiments, a stack of stackable planters is described. A stack includes a planter pot nestable with other such planter pots. The stack includes a first planter pot and a second planter pot, wherein each of the first planter pot and second planter pot are configured to be nestable with other such planter pots. Each planter pot includes a base, at least one planter sidewall formed on the base and extending upwards towards a rim that is larger in area than the base, and at least one hollow support pillar formed on the base and extending substantially vertically upwards with a drain opening at the top of each of the at least one hollow support pillars in communication with an exterior side of the base. The stack further includes a first removable riser and a second removable riser, wherein each removable riser is configured to be nestable with other such removable risers. Each removable riser includes, a plate having a bottom side supported by an interior of the at least one planter sidewall above the base, and a top side of the plate having a same area as the base, and at least one aperture configured to accept a corresponding hollow support pillar. In an operation mode, the first removable riser is inserted with the top side facing up into the first stackable planter with the first removable riser being supported at least by an interference fit between a perimeter of the bottom side and an interior side of the planter sidewall, and the second removable riser is inserted with the top side facing up into the second stackable planter with the second removable riser being supported at least by an interference fit between a perimeter of the bottom side and an interior side of the planter sidewall. In a nested mode, the first stackable planter, the second stackable planter, the first removable riser and the second removable riser are all nested together to form a single planter stack.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
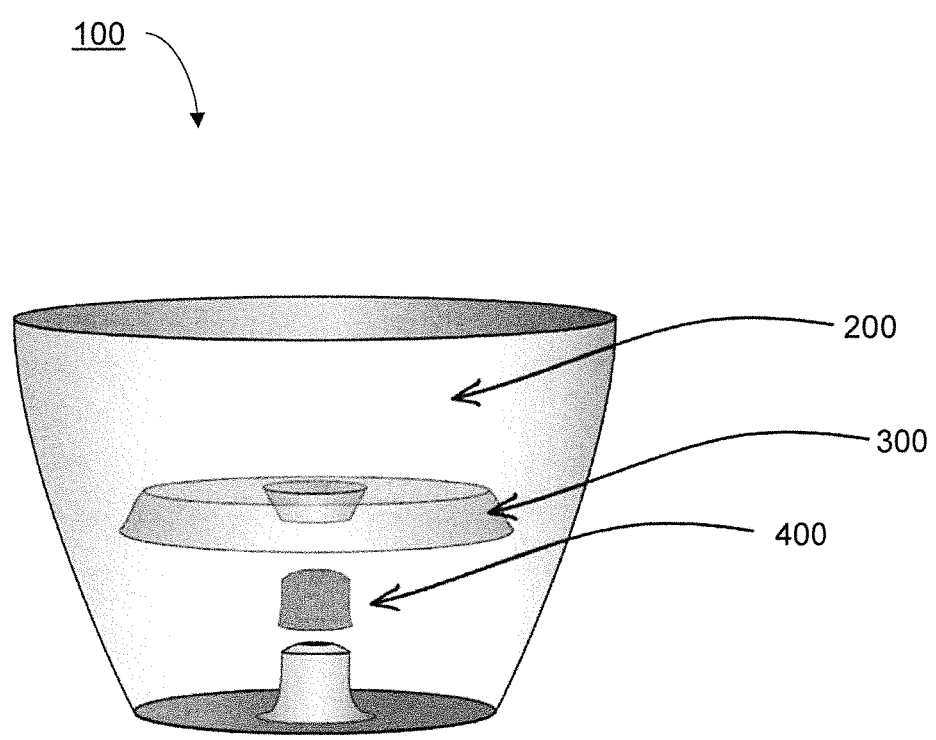
FIG. 1 is a cross-sectional view of a self-watering planter system including a stackable planter pot and a stackable riser in accordance with one embodiment.

Disclosed herein are embodiments and aspects of an inventive self-watering planter having planter pot and a removable riser insert. The planter pot and riser combination are designed to increase storing and freight efficiency by enabling configurations that facilitate stacking and space reduction.

According to embodiments of the present invention, the self-watering planter may include a stackable planter pot that may be shaped to enable stacking with other such planters. Such a shape can include, e.g., having a base and rim wherein the base is smaller than the rim, and sidewalls in between the base and the rim are sloped therebetween. Features of the stackable planter pot, such as a support post formed on the base and extending upward, may similarly be shaped with sloped sidewalls. As a result, multiple such stackable planter pots may be inserted into each other in a nested arrangement, decreasing the interior volume of the stack of stackable planter pots, and improving freight and space efficiency. Such a nested configuration, enabled by the shape of the stackable planter pot, decreases shipping costs and improving storage efficiency.

The self-watering planter may include a removable stackable riser. The stackable riser may also have a stackable design. Such a design may include, e.g., an outer sidewall that is sloped and is formed between a top side and a relatively larger bottom side. The stackable riser may also include apertures corresponding to any support posts in the base of the planter, wherein the apertures may include similarly sloped sidewalls. Due to the sloped sidewalls of the stackable riser, a stackable riser may be stacked with multiple other similar stackable risers in a nested configuration to reduce the interior volume of a stack. Accordingly, similar to the stackable planter pot, the stackable riser configuration also enables improved freight and space efficiency, thus reducing shipping costs and improving storage efficiency of a plurality of self-watering planters.

Additionally, according to aspects of the present invention, the stackable riser may be shaped such that when inserted upside-down into the planter, the top side abuts the base of the stackable planter pot. Such a configuration enables a stack of stackable risers to be turned upside down and inserted into a stack of corresponding stackable planter pots in a nested configuration. As a result, the interior volume of the stackable planter pots and stackable riser are minimized, thus improving space efficiency and freight efficiency of the stacks.

Accordingly, the self-watering planter according to aspects of the present invention may be stacked together in such a way that there is little to no space between individual planters or individual risers. By enabling the stacking of planters and risers in a nestable fashion, the planters and risers may be easily shipped in large quantities. Because of the low interior volume of the stack, more self-watering planters may be fit into an individual shipping container, thus reducing the number of shipping containers needed, and therefore reducing the costs of shipping. Similarly, the nestable arrangement of the planters and risers enables stores and warehouses to store the self-watering planters in a smaller area, thus freeing more space for more products. Additionally, a buyer with multiple such self-watering planters may also more easily store the self-watering planters when not in use. As a result, the self-watering planters of embodiments of the invention offer significant functional and financial advancements to previous planters, which cannot be nested and thus take up large amounts of space.

The planters in accordance with the present principles may be fabricated by molding processes using plastics; however, other materials are contemplated as well. For example, the planters may include metal construction, concrete, wood, etc. In one embodiment, the planters are a monolithic construction (e.g., one piece).

It is to be understood that the present invention will be described in terms of a given illustrative architectures; however, other architectures, structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a cross-sectional view of a self-watering planter 100 including a stackable planter pot 200 and a stackable riser 300 accordance with one embodiment is shown in accordance with the present principles.

According to aspects of the present embodiment, a self-watering planter 100 may include the combination of a plurality of components, such as a stackable planter pot 200 and a stackable riser 300. There may also be a perforated sleeve 400 to prevent soil from falling through apertures in the stackable riser 300. The stackable riser 300 may be insertable into the stackable planter pot 200, with a perforated sleeve 400 in between.

Figure 2:
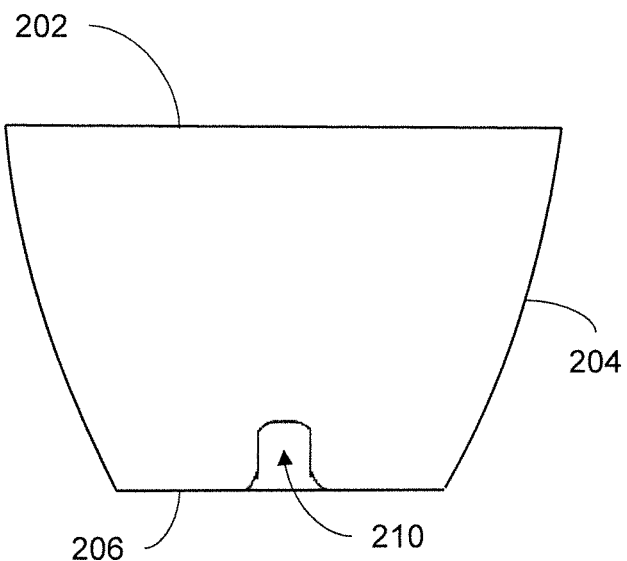
FIG. 2 is a cross-sectional view of a stackable planter pot in accordance with another embodiment.

Referring now to FIG. 2, a cross-sectional view of a stackable planter pot 200 according to another embodiment of the present invention is illustratively depicted.

According to aspects of embodiments of the inventions, the stackable planter pot 200 may include a planter rim 202, a planter base 206, and planter sidewall 204 and a support pillar 210.

Figure 6:
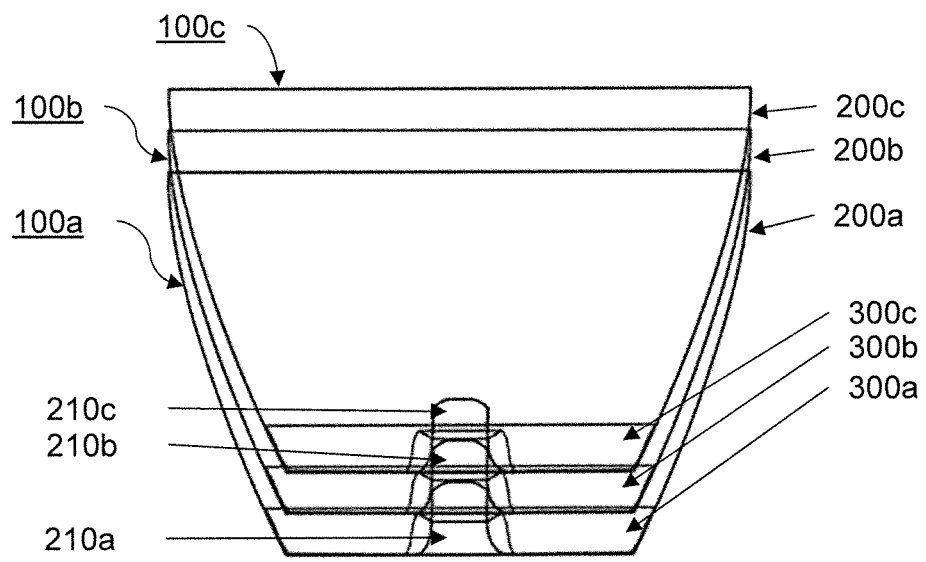
FIG. 6 is a cross-sectional view of a stacking configuration for a stackable planter pot and stackable riser in accordance with another embodiment.
Figure 7:
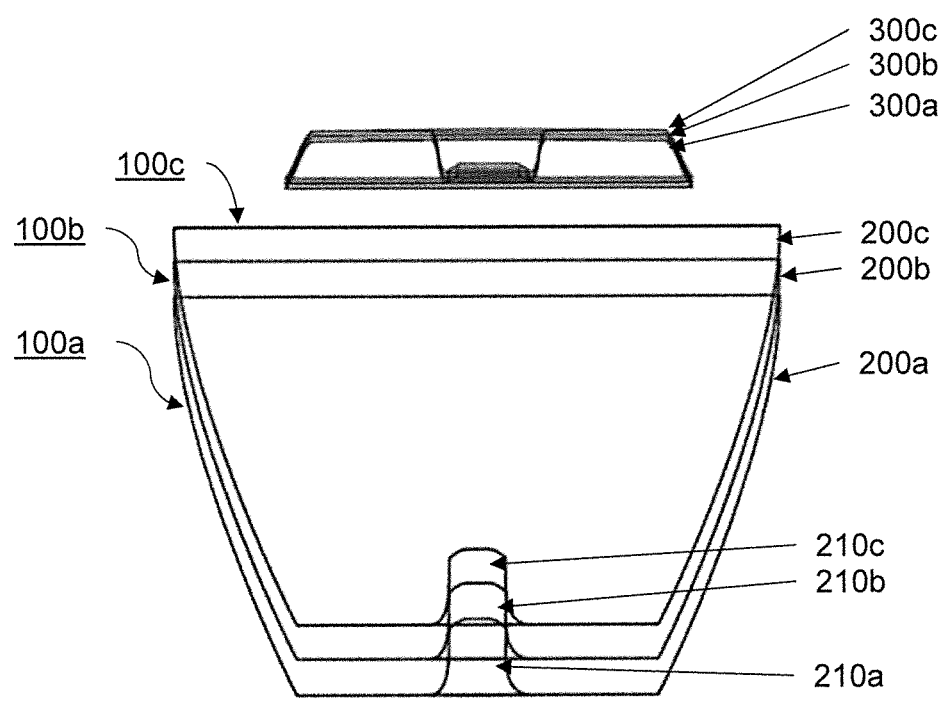
FIG. 7 is a cross-sectional view of a stacking configuration for a stackable planter pot and stackable riser in accordance with another embodiment.

To facilitate stacking, the planter base 206 may have a smaller footprint than the planter rim 202. By making the planter base 206 smaller than the planter rim 202, a second stackable planter may be inserted, base first, through the planter rim 202. The planter sidewall 204 may therefore be formed in between the planter rim 202 and planter base 206 in any suitable shape such that the second stackable planter can be nested all the way into the stackable planter 200. For the purposes of this description, the terms nest, nesting and nestable are intended to refer to a configuration that includes the ability to fit the exterior of one object within the interior of another object (for example, fitting the exterior of one stackable planter pot within the interior of an additional stackable planter pot as depicted in FIGS. 6 and 7). The planter base 206 and the planter rim 202 may be, e.g., circular in footprint, however they may also be square, rectangular, or another other suitable shape.

The planter sidewall 204 may be integrally formed with both the planter base 206 and planter rim 202, such as, e.g. through a plastic, cement, or metal molding process. However, the planter sidewall 204 may also be attached or fastened to either the planter base 206 or planter rim 202 or both. Additionally, the planter rim 202 may be a portion of the planter sidewall 204, or it may be a separate component. The planter sidewall 204 connects the planter base 206 to the planter rim 202 such that a hollow, open topped vessel is formed. Accordingly, the sidewall 204 may have straight walls extending directly from the base 206 to rim 202, or it may curve, or follow any other suitable form. As result, the planter sidewall 204 will be substantially vertical (i.e. extending from the base 206 to the rim 202 at an angle between about 50 degrees and 90 degrees with respect to a horizontal plane).

Figure 4:
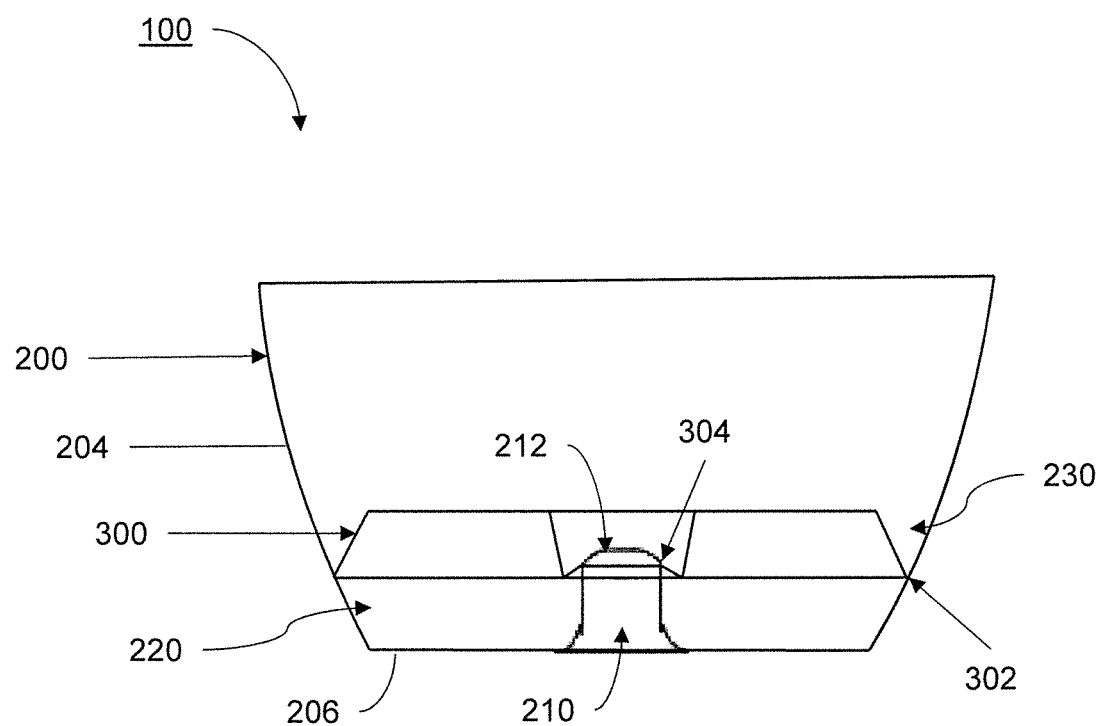
FIG. 4 is a cross-sectional view of the stackable riser inserted into a stackable planter pot in accordance with another embodiment.

Included in the planter base 206 may be a support pillar 210. The support pillar 210 may both provide a support for a riser to be inserted into the stackable planter pot 200, as well as accommodating a drain hole (not shown) in the top of the support pillar 210 leading to a cavity communicating the exterior of the planter base 206. In this way, the height of the support pillar 210 determines the height above the planter base 206 that a riser will be located, as well as a maximum water level due to the drain hole. As a result, the support pillar 210 may have a height determined to be the optimal depth of water contained in a reservoir 220 formed between the riser and the planter base 206, as depicted in FIG. 4.

The support pillar 210 may be integrally formed on the planter base 206 and extending vertically upwards towards the planter rim 202. The support pillar 210 may be substantially vertical (i.e. extending upwards with sidewalls formed at an angle between about 50 degrees and 90 degrees with respect to a horizontal plane). However, the support pillar 210 may also be attached or fastened to the planter base 206 as a separate component in any suitable fashion.

Additionally, the support pillar 210 is configured to be stackable. Thus when a second planter pot with a support pillar is nested into the stackable planter pot 200, the support pillar 210 may fit within the cavity of the support pillar of the second planter pot. As a result, the second planter pot may be nested all the way into the stackable planter pot 200. This may be accomplished by using a support pillar 210 having sloped or curved sides similar to the planter sidewalls 204 such that the support pillar 210 is narrowest at the top around the drain hole and broadest where the support pillar 210 meets the planter base 206. The top of the support pillar 210 and the base of the support pillar 210 may be, e.g., circular in footprint, however they may also be square, rectangular, or another other suitable shape.

Figure 3A:
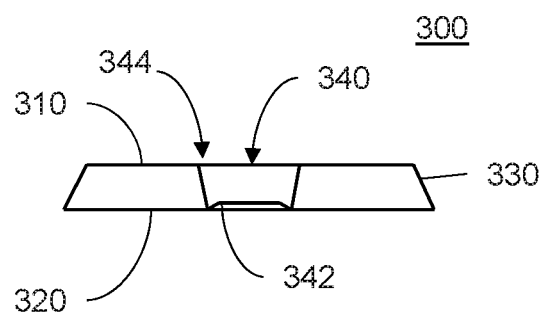
FIG. 3A is a cross-sectional view of a stackable riser in accordance with one embodiment.
Figure 3B:
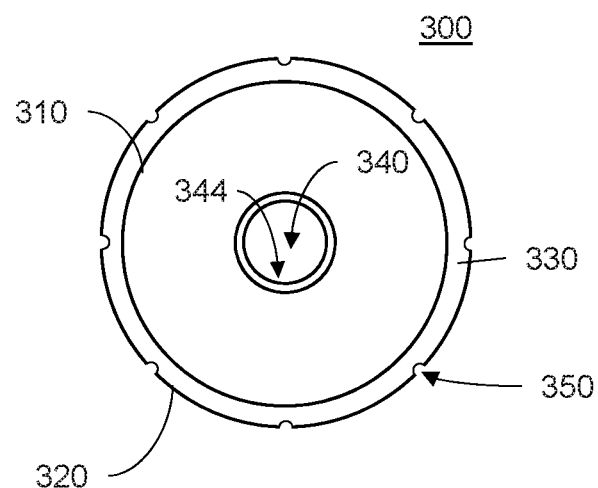
FIG. 3B is a top view of a stackable riser in accordance with one embodiment.

Referring now to FIGS. 3A and 3B, a cross-sectional view and top view, respectively, of a stackable riser 300 according to another embodiment of the present invention is illustratively depicted.

Aspects of embodiments of the present invention include a stackable riser 300 having a top side 310, bottom side 320, riser sidewall 330 and support aperture 340. The riser sidewall 330 is formed between, and connects the top side 310 and the bottom side 320 and is configured to enable stacking of additional stackable risers. As such, the bottom side 320 may have a larger footprint than the top side 310 such that a second stackable riser can be nested by inserted the top side of the second stackable riser into the bottom side 320. Accordingly, the bottom side 320 include a rim with an opening communicating with an interior cavity bounded by the top side 310 and the riser sidewall 330. To enable the insertion of the second stackable riser, the opening may be larger in size than the top side of the second stackable riser. The top side 310 and the bottom side 320 may be, e.g., circular in footprint, however they may also be square, rectangular, or another other suitable shape such that additional stackable risers 300 are nestable with each other and with the bottom of the stackable planter 200. Thus, the shape of the stackable riser 300 should correspond to the shape of the stackable planter 200 to permit nesting and stacking.

The top side 310 is designed to support a plant and soil mixture above a reservoir at the bottom of a planter pot. Therefore, the top side 310 may face upwards when in position in a planter pot. The top side 310, according to aspects of the invention, may have an, e.g., perforated plate design to allow for the communication of water between the soil and the reservoir. The perforated design may come in the form of, for example, slit like openings, a mesh or screen, a plurality of holes, or any other suitable design for supporting soil while allowing for the communication of water. However, the top side 310 may alternatively be a solid plate, with no perforations. In the case where the top side 310 is solid, water may communicate between the soil and the reservoir via water communication structures 350 along the perimeter of the bottom side 320. The water communication structures 350 may include cuts, dents, dimples, perforations, or any other structure that enables water to pass into the trough 230. Alternatively, the riser sidewall 330 may be solid or perforated (e.g., formed from a mesh) to permit water to communicate from the reservoir beneath the stackable riser 300.

The support aperture 340 may be used to support the riser at the bottom of a plater pot with a support pillar, such as support pillar 210 of FIG. 2. The support aperture 340 may match the shape of the support pillar such that when the support pillar is inserted into the support aperture 340, the aperture walls 344 uniformly contact the exterior of the support pillar 210, ensuring a high quality and secure fit.

However, according to aspects of embodiments of the invention, to improve the nesting of additional stackable risers, a bottom end of the support aperture 340 proximal to the bottom side 320 of the stackable riser 300 may be smaller in footprint than a top end proximal to the top side 310. Such an arrangement permits the top side of a second stackable riser to be inserted into the bottom side 320 of the stackable riser 300 such that a top end of a support aperture in the second stackable riser fits around the support aperture 340 of the stackable riser 300, as will be discussed in further detail with reference to FIG. 7 below. The top end of the support aperture 340 and the bottom end of the support aperture 340 may be, e.g., circular in footprint, however they may also be square, rectangular, or another other suitable shape such that additional stackable risers 300 are nestable with each other and with the support pillar 210. Thus, the shape of the stackable riser 300 should correspond to the shape of the stackable planter 200 to permit nesting and stacking.

Additionally, according to aspects of embodiments of the invention, the support aperture 340 may further include a portion within the aperture having a restricted perimeter, thus forming a support ring 342. The support ring 342 may therefore have a smaller footprint than both the bottom end and the top end of the support aperture 340. The support ring 342 may therefore define the area of contact between the support aperture 340 and a support pillar. The vertical position of the support ring 342 within the support aperture 340 may, consequently, determine the height of the stackable riser 300 relative to a base of a stackable planter pot.

Referring now to FIG. 4, a cross-sectional view of the stackable riser 300 inserted into a stackable planter 200 according to another embodiment of the present invention is illustratively depicted.

According to aspects of the invention, the stackable riser 300 may be inserted into a stackable planter pot 200 to form a self-watering planter 100. Portions of the stackable planter pot 200 may serve to support the stackable riser 300 as contact regions 302. According to aspects of the embodiment, contact regions 302 may include the perimeter of the stackable riser 300 as it contacts the interior of the stackable planter pot 200. Due to the slant and/or curve of the sidewalls 204 of the stackable planter pot 200, the sidewalls 204 provide a vertical support on the perimeter of the bottom side 320 of the stackable riser 300, thus creating an interference fit between the stackable riser 300 and the planter sidewalls 204. As a result, the stackable riser 300 is supported at a height within the stackable planter 200 and forming a reservoir 220 beneath the stackable riser 300.

Because the bottom side 320 is larger in area than the top side 310, there is a lateral distance between the top side 310 and the interior of the sidewall 204 of the stackable planter pot 200. The lateral distance decreases down to where the stackable insert 300 contacts the stackable planter pot 200, creating a trough 230 with a substantially triangular cross section that may contain soil. The soil in the trough 230 absorbs water that seeps into the trough 230 from the reservoir, and wicks the water to plant roots through capillary action. The water may seep into the trough 230 through water communication structures 350 in either the bottom side 320 or the interior of the sidewall 204. The water communication structures 350 may include cuts, dents, dimples, perforations, or any other structure that enables water to pass into the trough 230.

Additional support may be provided by the support pillar 210 and support aperture 340. The stackable riser 300 may, therefore, also include additional contact regions 304 on the support pillar 210 at the support rim 342 of the stackable riser. The additional contact regions 304 may improve the quality of the fit between the stackable riser 300 and the stackable planter pot 200 by providing additional structural support to the stackable riser 300 or an alignment configuration to ensure that the stackable riser 300 is in the most stable position, or both. Therefore, the stackable riser 300 is less like to bend or break as a result of heavy plants and soils supported thereon.

While the support ring 342 may contact a topmost portion of the support pillar 210, according to aspects of embodiments of the invention, the support pillar 210 may also extend above the support ring 342 to form a drain projection 212. The drain projection 212 enables a drain hole (not shown) height that is not limited by the additional contact regions 304. Accordingly, a drain hole height can be determined to be any suitable height to prevent overwatering of a plant. The drain projection 212 may also assist with locating the stackable riser 300 within the stackable planter pot 200 by tapering to a narrow top portion proximal to the drain hole.

Figure 5A:
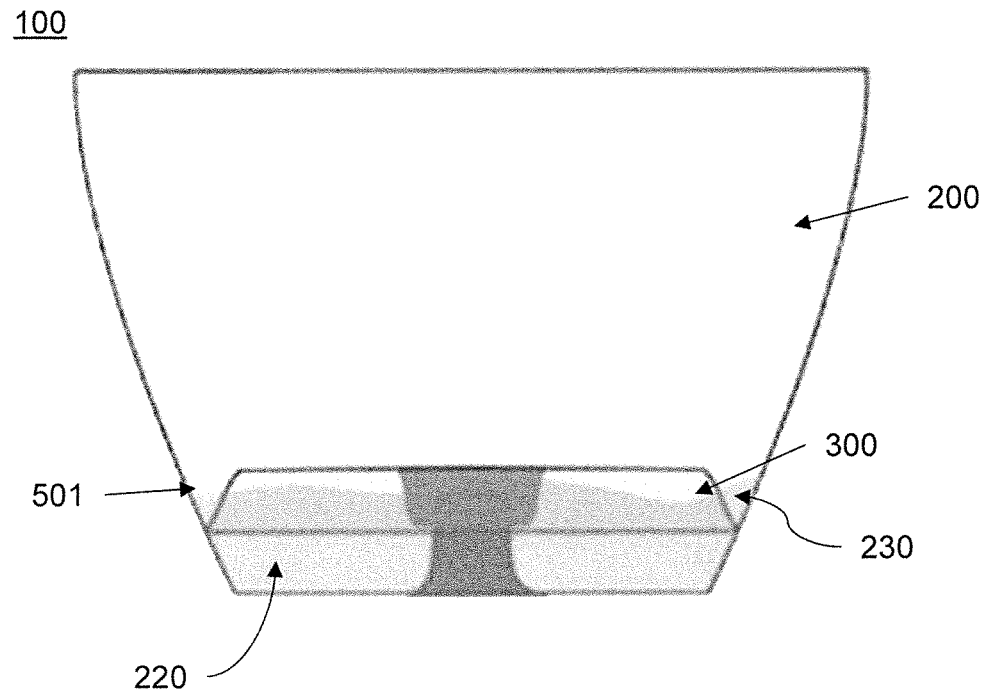
FIG. 5A is a cross-sectional illustration of a stackable riser inserted into a stackable planter pot in operation therein in accordance with another embodiment.

Referring now to FIG. 5A, a cross-sectional illustration of a stackable riser 300 inserted into a stackable planter 200 in operation according to another embodiment of the present invention is illustratively depicted.

According to aspects of embodiments of the invention, the self-watering planter 100 including a stackable riser 300 inserted into a stackable planter pot 200 may maintain a reservoir of water 220 at a desired water level 501. The desired water level 501 may be at or below the top side of the stackable riser 300. Accordingly, the desired water level 501 may be sufficient to bring the water into communication with the soil contained in the trough 230 of the self-watering planter 100, enabling capillary action by the soil to transport water to plant roots.

The water may communicate with the soil in the trough 230 between the stackable riser 300 and the interior of the sidewall 204 of the stackable planter pot 200. Water may enter into this space by openings around the perimeter of the bottom side 320. Soil within that space may then absorb the water and wick the water up to roots of a plant contained within the self-watering planter 100 by capillary action.

Accordingly, the water in the reservoir 220 is at such a desired water level 501 as to enable the soil contained within the self-watering planter 100 to automatically provide the roots of a plant with water. Thus the combination of the stackable riser 300 and the stackable planter pot 200 results in a self-watering system.

Figure 5B:
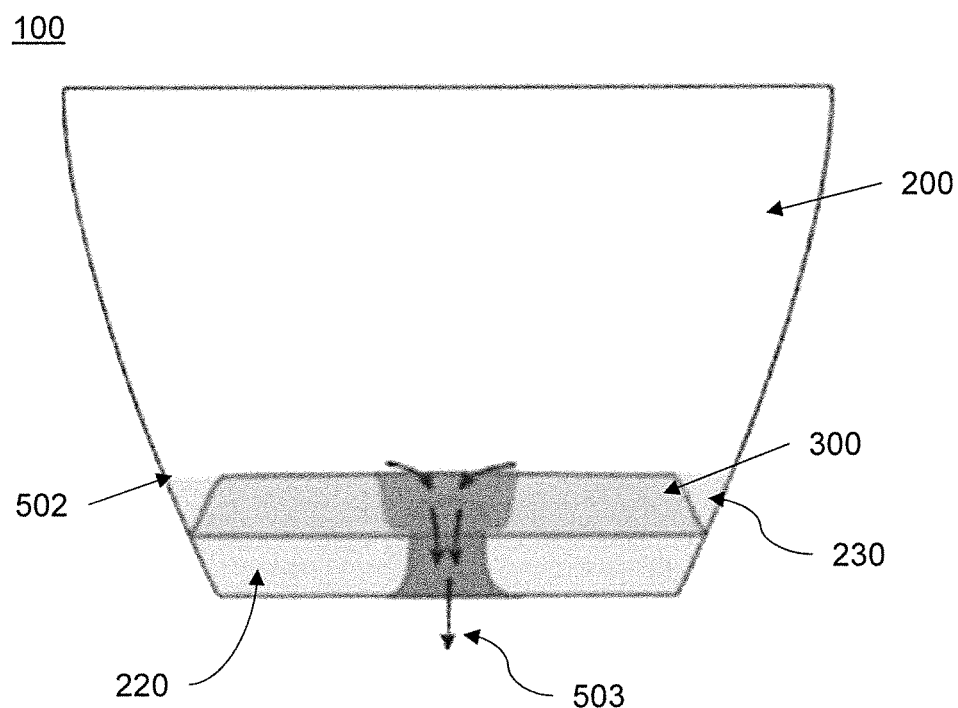
FIG. 5B is a cross-sectional illustration of a stackable riser inserted into a stackable planter pot in operation in draining excess water in accordance with another embodiment.

Referring now to FIG. 5B, a cross-sectional illustration of a stackable riser 300 inserted into a stackable planter 200 in operation in draining excess water according to another embodiment of the present invention is illustratively depicted.

According to aspects of embodiments of the present invention, the water in the reservoir 220 may rise to an undesired water level 502 as a result of overfilling the self-watering planter 100. The undesired water level 502 may be, e.g., immediately above the top side 310 of the stackable riser 300. If water reaches this undesired water level 502, the plant may become overwatered if the water is not drained. Accordingly, the drain hole of the support pillar 210 is in communication with the top side 310 of the stackable riser 300 through the support aperture 340. This enables water to flow through the drain hole to drain from self-watering planter 100 via a drain path 503. As a result, the water is prevented from reaching undesirable levels 502, thus preventing overwatering of a plant.

Referring now to FIG. 6, a cross-sectional view of a stacking configuration for a plurality of stackable planters 200a-c and a plurality of stackable riser 300a-c according to another embodiment of the present invention is illustratively depicted.

According to aspects of the invention, a stacking configuration exists for stacking multiple self-watering planters 100a, 100b and 100c together. In one possible configuration, each self-watering planter 100a-c includes a stackable planter pot 200a-c and stackable riser 300a-c.

To facilitate stacking, the stackable risers 300a-c may be flipped upside-down and inserted into each respective stackable planter pot 200a-c. For example, stackable riser 200a may be flipped upside-down so that the top side 310 is facing the base 206 of the stackable planter pot 200a. Inserting the stackable riser 300a into the stackable planter pot 200a brings the top side 310 into contact with the base 206. The support ring 342 of the support aperture 340 for the stackable riser 300a may be configured such that the support ring 342 does not contact the support pillar 210 at least until the top side 310 contacts the base 206, thus minimizing any space between the top side 310 and base 206.

Because the top side 310 contacts the base 206, a subsequent stackable planter pot 200b may be inserted into the stackable planter pot 200a such that the base of the stackable planter bot 200b fits into a cavity in the stackable riser 300a through an opening in the bottom side 320 of the stackable riser 300a.

The stackable planter pots 200a-c may include support pillars that are configured to be insertable into each other. As a result, when stackable planter pot 200b is inserted into stackable planter pot 200a, the support pillar 210a of stackable planter pot 200a inserts into a corresponding support pillar of the stackable planter pot 200b. The support pillars of each stackable planter pot 200a-c may be configured to insert a desired distance into a subsequent corresponding support pillar 210a-c so as to minimize an internal volume between stackable planter pot 200a and stackable planter pot 200b, and between stackable planter pot 200b and stackable planter pot 200c.

Any internal volume between stacked stackable planter pots 200a-c may be substantially occupied by the stackable risers 300a-c which have been inserted into respective stackable planter pots 200a-c. As a result, the self-watering planters 100a-c are efficiently nested together to improve freight efficiency and minimize storage space.

Referring now to FIG. 7, a cross-sectional view of a stacking configuration for a stackable planter 200 and stackable riser 300 in accordance with another embodiment of present invention is illustratively depicted.

According to aspects of the invention, a stacking configuration exists for stacking multiple self-watering planters 100a, 100b and 100c together. In one possible configuration, each self-watering planter 100a-c includes a stackable planter pot 200a-c and stackable riser 300a-c.

According to aspects of an embodiment, the stackable risers 300a-c may be stacked separately from the stackable planter pots 200a-c. The stackable planter pots 200a-c may be stacked together in a similar fashion to that described for FIG. 6, except that each stackable riser 300a-c is not inserted into each respective stackable planter pot 200a-c. Rather, the stackable risers 300a-c may be separately stacked together such that the top side of stackable riser 300a is inserted into the an opening in the bottom side of the stackable riser 300b. The support aperture for each stackable riser 300a-c may be configured to have a cavity such that the support aperture of stackable riser 300a envelopes the support aperture of stackable riser 300b. Thus, when stackable riser 300a is nested with stackable riser 300b, the bottom end of the support aperture for stackable riser 300b is inserted into the support aperture for the stackable riser 300a. Accordingly, stackable riser 300a can be fully inserted into stackable riser 300b, and stackable riser 300b can be fully inserted into stackable riser 300c such that an interior volume of the stack is minimized.

The stack of stackable risers 300a-c may then be inserted into a stack of stackable planters 200a-c, either top side oriented upwards, or top side oriented downwards. As a result, the self-watering planters 100a-c are efficiently nested together to improve freight efficiency and minimize storage space. The support pillars of each stackable planter pot 200a-c may be configured to insert a desired distance into a subsequent corresponding support pillar 210a-c so as to minimize an internal volume between stackable planter pot 200a and stackable planter pot 200b, and between stackable planter pot 200b and stackable planter pot 200c.

Figure 8:
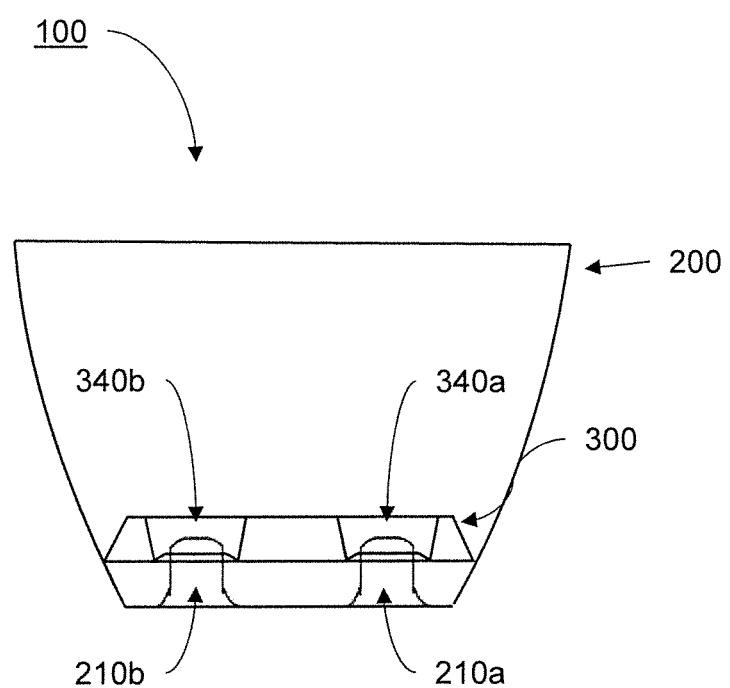
FIG. 8 is a cross-sectional view of stackable planter and a stackable riser combination in accordance with another embodiment.

Referring now FIG. 8, a cross-sectional view of a stackable planter 200 having two support pillars 210a and 210b, and a stackable riser 300 having two support apertures 340a and 340b is illustratively depicted in accordance with embodiments of the present invention.

According to aspects of embodiments of the invention, the stackable planter 200 may include two or more support pillars 210a-b. The support pillars 210a-b be of a similar shape to the support pillar 210 described above, but may be formed on the base 206 of the stackable planter 200 off of center. Or one of the support pillars 210a-b may be on center, with other support pillars 210a-b off of center. Accordingly, any number of support pillars 210a-b may be used, such as, e.g., 2 arranged in a symmetrical pattern, 3 arranged in a triangular pattern, 4 arranged in a rectangular pattern, 5 arranged in a cross pattern or a pentagonal pattern, etc. Regardless of how many support pillars 210a-b are included, the support pillars 210a-b should be stackable and/or nestable with other support pillars on other stackable planters.

The self-watering planter 100 having a stackable planter pot 200 with two or more support pillars 210a-b should also include a stackable riser 300 having a corresponding number of support apertures 340a-b. The support apertures 340a-b may include a configuration such as that described above in regards to support aperture 340 such that the support apertures of additional stackable risers are nestable with support apertures 340a-b.

The support apertures 340a-b should mate with the corresponding support pillars 210a-b to support and/or position the stackable riser 300 within the stackable planter pot 200. Thus, the support apertures 340a-b should have a similar configuration to the support pillars 210a-b, such as, e.g., 2 arranged in a symmetrical pattern, 3 arranged in a triangular pattern, 4 arranged in a rectangular pattern, 5 arranged in a cross pattern or a pentagonal pattern, etc.

Figure 9:
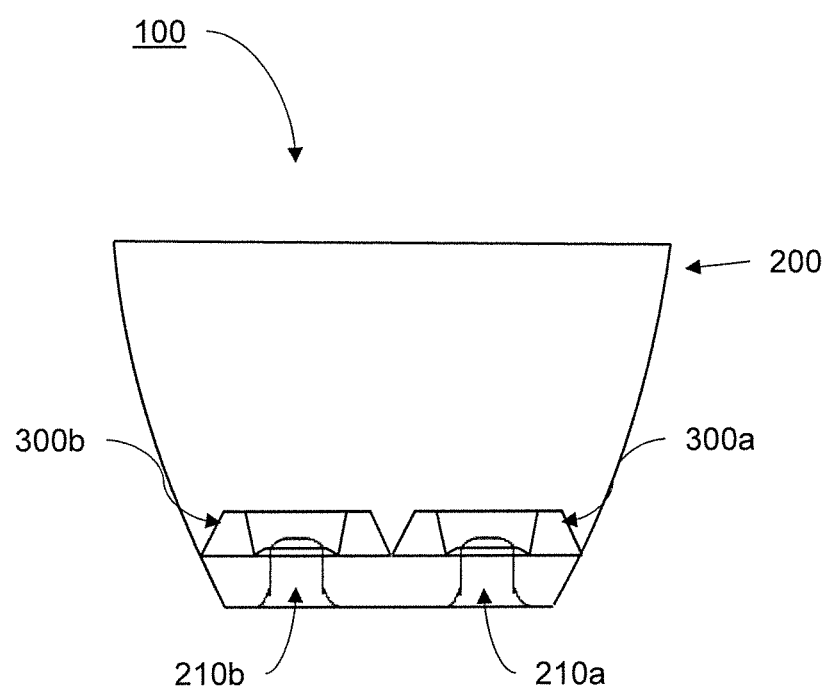
FIG. 9 is a cross-sectional view of stackable planter and stackable risers combination in accordance with another embodiment.

Referring now FIG. 9, a cross-sectional view of a stackable planter 200 having two support pillars 210a and 210b, and two stackable risers 300a and 300b is illustratively depicted in accordance with embodiments of the present invention.

Similar to the view depicted in FIG. 8, the stackable planter 200 may include two or more support pillars 210a-b. The support pillars 210a-b be of a similar shape to the support pillar 210 described above, but may be formed on the base 206 of the stackable planter 200 off of center. However, rather than a single stackable riser 300 depicted in FIG. 8, the self-watering planter 100 may have multiple stackable risers 300a-b, with each stackable riser 300a-b corresponding to a respective support pillar 210a-b.

The stackable risers 300a-b may be similar in construction to the individual stackable risers described in other relation to other figures, in that each stackable riser 300a-b may include a single, centrally located support aperture configured to engage with a corresponding support pillar 210a-b in order to support and position the stackable riser 300a-b. Depending on the number and configuration of the support pillars 210a-b, each stackable riser 300a-b may have one or more support apertures. For example, there may be a stackable riser 300a-b corresponding each one of the support pillars 210a-b. However, there may be one stackable riser 300a or 300b for each two or each three support pillars 210a-b. In such a configuration, each stackable riser 300a-b may have two or three, respectively, support apertures to engage with the corresponding support pillars 210a-b.

The stackable risers 300a-b should be configured to fit within the stackable planter pot 200 such that the combination of the stackable risers 300a-b forms a single floor on which soil and plants may be supported above a reservoir. For example, in the case of a circular stackable planter pot 200 having two support pillars 210a-b, there may be two stackable risers 300a-b with each stackable riser 300a-b taking the form of a semi-circular. Each stackable riser should, therefore, be formed with a flat side that rest adjacent to each other when the stackable risers 300a-b are inserted into the stackable planter pot 200 such that the stackable risers 210a-b together form a circle corresponding to the interior of the stackable planter pot 200. However, other configurations are contemplated.

As another example, a stackable planter pot 200 having a circular form and four support pillars 210a-b with four corresponding stackable risers 300a-b, and the stackable risers 300a-b each being configured as a quarter circle such that the four stackable risers 300a-b form a complete circle corresponding to the interior of the stackable planter pot 200. Yet another configuration could include a square or rectangular stackable planter 200 having any number of support pillars 210a-b, with a corresponding stackable riser 300a-b for each support pillar 210a-b such that the stackable risers 300a-b together form a square or rectangle corresponding to the interior of the stackable planter pot 200. Any other shape and number of support pillars 210a-b and stackable riser 300a-b may be used.

Regardless of the shape of stackable planter pots 200, the stackable planter pots 200 with support pillars 210a-b should be configured to be able to nest with other such stackable planter pots, as described with reference to other figures above. Similarly, regardless of the shape and number of stackable risers 300a-b, each stackable riser 300a and 300b should be configured to nest with each other stackable riser 300a-b and other such stackable risers as discussed above with reference to the other figures.

Having described preferred embodiments for planters with elevated internal portion and water preservation features (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is desired to be protected by Letters Patent is set forth.

What is claimed is:

1. A stack of stackable planters, comprising:
 a first planter pot and a second planter pot, wherein each of the first planter pot and second planter pot are configured to be nestable with other matching planter pots, and include:
 a base;
 at least one planter sidewall formed on the base and extending upwards towards a rim that is larger in area than the base;
 at least one hollow support pillar formed on the base and extending substantially vertically upwards with a drain opening at the top of each of the at least one hollow support pillars in communication with an exterior side of the base;
 a first removable riser and a second removable riser, wherein each removable riser is configured to be nestable with other matching removable risers, and include:
 a plate having a bottom side configured to be supported only by an interior of the at least one planter sidewall above the base by an interference fit, and a top side of the plate having a same area as the base; and
 at least one aperture configured to accept a corresponding hollow support pillar;
 wherein, in an operation mode, the first removable riser is inserted with the top side facing up into the first stackable planter with the first removable riser being supported by the interference fit between a perimeter of the bottom side and an interior side of the planter sidewall, and the second removable riser is inserted with the top side facing up into the second stackable planter with the second removable riser being supported by the interference fit between a perimeter of the bottom side and an interior side of the planter sidewall; and
 wherein, in a nested mode, the first stackable planter, the second stackable planter, the first removable riser and the second removable riser are all nested together to form a single planter stack,
 wherein with the first and second removable risers each in the nested mode within the first and the second planters, respectively, the first planter is inserted into the second planter in a nested fashion, wherein the support pillar of the second planter maintains a clearance between the base of the first planter and the second removable riser.

2. The stack of stackable planters of claim 1 wherein, in the nested mode, the first removable riser is inserted into the second removable riser in a nested fashion to form a removable riser stack, and the first planter is inserted into the second planter in a nested fashion to form a planter stack, with the removable riser inserted into the planter stack.

\* \* \* \* \*